(12) United States Patent
Spahn

(10) Patent No.: US 7,238,950 B2
(45) Date of Patent: Jul. 3, 2007

(54) X-RAY DETECTOR

(75) Inventor: Martin Spahn, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 192 days.

(21) Appl. No.: 10/909,042

(22) Filed: Jul. 30, 2004

(65) Prior Publication Data

US 2005/0056790 A1 Mar. 17, 2005

(30) Foreign Application Priority Data

Jul. 30, 2003 (DE) ............... 103 34 818

(51) Int. Cl.
*G01T 1/20* (2006.01)
(52) U.S. Cl. ............................... 250/370.11
(58) Field of Classification Search ........... 250/370.11
See application file for complete search history.

(56) References Cited

U.S. PATENT DOCUMENTS 5,548,123 A * 8/1996 Perez-Mendez et al. .......... 250/370.11
6,303,943 B1 * 10/2001 Yu et al. ................... 257/40
6,442,238 B2 * 8/2002 Meulenbrugge ......... 378/98.8

FOREIGN PATENT DOCUMENTS

EP 1 291 676 3/2003
WO WO 02/06853 1/2002

OTHER PUBLICATIONS

"Digital Radiography with a Large-Area, Amorphous-Silicon, Flat-Panel X-ray Detector System," Spahn et al., Investigative Radiology, vol. 35, No. 4 (2000) pp. 260-266.
"Plastic Solar Cells," Brabec et al., Advanced Functional Materials, vol. 11, No. 1 (2001), pp. 15-25.

* cited by examiner

*Primary Examiner*—David Porta
*Assistant Examiner*—Shun Lee
(74) *Attorney, Agent, or Firm*—Schiff Hardin LLP

(57) ABSTRACT

An x-ray detector has a number of detector elements, each formed from a first photodiode and a luminophore applied thereon. To measure the dose rate, a second photodiode is provided on an incident surface of the luminophore facing the first photodiode.

14 Claims, 3 Drawing Sheets

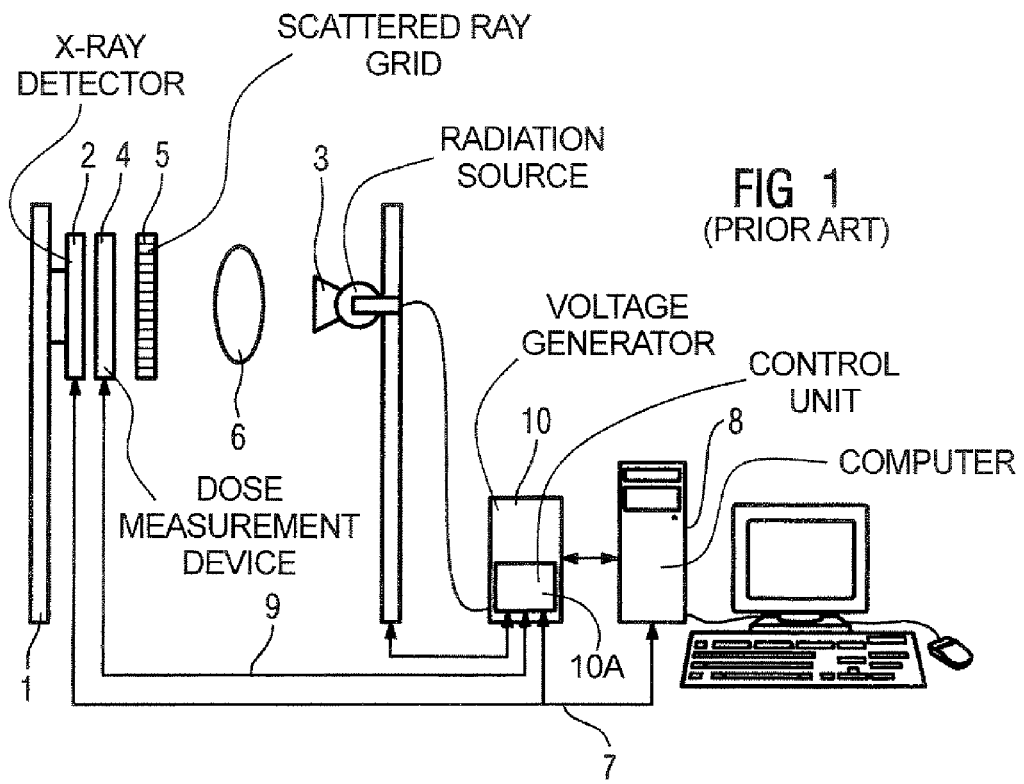
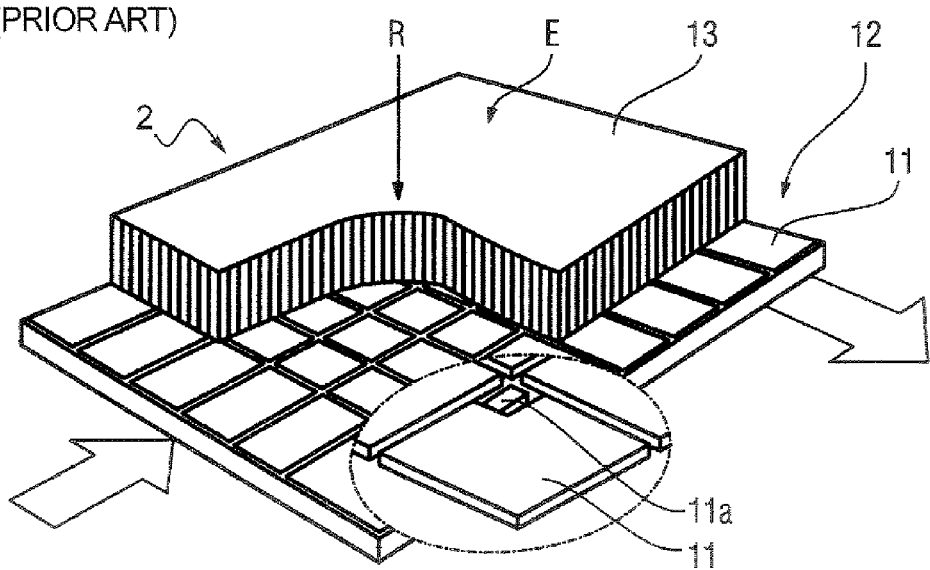

X-RAY DETECTOR

BACKGROUND OF THE INVENTION

1. Field of the Invention

The invention concerns an x-ray detector of the type having a number of detector elements, each formed by a photodiode and a luminophore.

2. Description of the Prior Art

An x-ray detector of the above general type is known from "Digital Radiography with a Large-Area, Amorphous-Silicon, Flat-Panel X-Ray Detector System" by Spahn M. et al., Investigative Radiology 2000; Vol. 35, pages 260–266. In this known x-ray detector, a photodiode matrix (formed, for example, from amorphous silicon (a-Si)) is overlaid by a luminophore layer (formed, for example, from cesium iodide (CsI)). X-ray radiation radiated onto the luminophore layer is transduced into light in the luminophore layer. The light is detected with spatial resolution by the photodiode matrix and the resulting electrical signals are further processed by means of a downstream image-processing device.

In particular in radiography, it is sought for medical purposes to keep the dose of x-ray radiation radiated onto the person optimally low. For this, an apparatus is provided to regulate the dose rate. The apparatus includes a detector to measure the dose rate. The detector is connected via a regulation device with a high-voltage generator for the x-ray source. As soon as a predetermined dose has been reached, the high-voltage generator is deactivated by the regulation apparatus.

Conventionally, an ionization chamber disposed in the beam path is used as a detector to measure the dose rate. The structures formed by such detectors are disadvantageously imaged on the x-ray detector and undesirably adulterate the image information. In order to counteract this, a correction can ensue by means of computational methods. In specific cases, however, unwanted artifacts can occur in the implementation of such a correction. Conventional apparatuses to measure the dose are elaborate and, among other things, cause image errors.

SUMMARY OF THE INVENTION

An object of the present invention is to provide an x-ray detector wherein the disadvantages according to the prior art are avoided. In particular, such an x-ray detector should enable the measurement of a radiation dose rate in a simple and cost-effective manner.

This object is achieved in accordance with the invention by a radiation detector of the type initially described, and having a second photodiode on a radiation-incident surface of the luminophore, the second photodiode having a light-sensitive (active) surface facing the first photodiode. The invention makes use of the fact that the light produced in the luminophore does not exit at only one of the exit surfaces opposite the incident surface, but also exits from the incident surface itself. By detection of the light exiting from the incident surface, a radiation dose rate can be determined. The dose rate thus can be measured in a simple manner. Given a suitable design of the further photodiodes, no structures whatsoever are imaged. The formation of image errors and artifacts is prevented. The provision of a separate apparatus to measure the dose rate is not necessary. The proposed x-ray detector can be produced relatively simply and cost-effectively.

In an embodiment, the further photodetector is produced in the form of a thin layer with a thickness of at most 50 µm, preferably 0.5 to 1.5 µm. The further photodiode can be produced from a material with an average atomic number Z<14, preferably Z<10. In such an embodiment of the further photodiode, no structures whatsoever are imaged on the luminophore layer in the irradiation of the further photodiode.

In another embodiment, the further photodiode is produced from a semiconducting organic material. The production of components (such as photodiodes for transistors and the like) based on semiconducting polymers is known, for example, from "Plastic Solar Cells" by Christoph J. Brabec et al., Adv. Funct. Mater. 2001, 11, Nr. 1, pages 15 through 26. The teachings of this article are incorporated herein by reference. According to this article photodiodes, in particular, can be produced based on semiconducting polymers, for example at a thickness of 100 µm. Due to their thickness and the low atomic number of the polymer materials used for production, such a photodiode absorbs barely any x-ray radiation.

The luminophore is appropriately produced from a scintillator material selected from the following group: gadolinium oxide sulfide, CsI, NaI.

According to a further embodiment, a layer that is partially transparent to light can be provided between the luminophore and the further photodiode. This can be what is known as a semi-transparent layer that reflects a portion of the incident light. The light yield on the exit surface thus can be increased by the use of such a layer.

According to a further embodiment, each photodiode has a switch. The photodiodes appropriately form photodiode array. Each further photodiode can likewise include a further switch. The further photodiodes can form a further photodiode array. The provision of a switch for each photodiode and each further photodiode enables a sequential line-by-line readout of the charges stored by the photodiodes and the further photodiodes. By reading out the photodiodes, spatially resolved information about incident x-rays can be acquired. The readout of the further photodiodes enables the determination of a radiation dose rate.

The luminophore can be fashioned as a layer overlaying the photodiode array. This simplifies the production of the inventive x-ray detector and reduces the price thereof.

According to a further embodiment, a detection surface of the further photodiode is larger than a detection surface of the photodiode. The number of the photodiodes can appropriately be a (preferably even) multiple of the number of the further photodiodes. A detection surface of one of the further photodiodes appropriately covers the detection surfaces of a number of the photodiodes. To determine a radiation dose rate, a precise, spatially resolved measurement of incident x-ray radiation is not necessary. A rough spatially resolved measurement over the total detection surface formed by the photodiode array is sufficient.

DESCRIPTION OF THE DRAWINGS

FIG. 1 is a schematic illustration of the basic components of a conventional x-ray detector.

FIG. 2 is a perspective view of a conventional x-ray detector.

DESCRIPTION OF THE PREFERRED EMBODIMENTS

Figure 3:
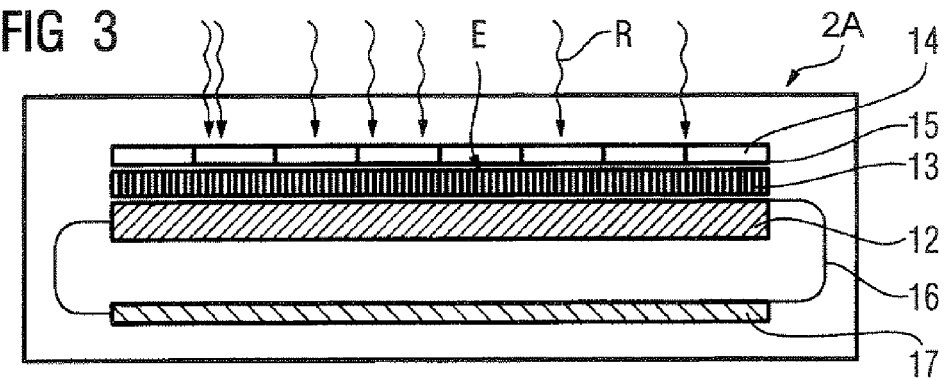
FIG. 3 is a schematic cross-section view of a first embodiment of an x-ray detector.

In the conventional x-ray apparatus shown in FIG. 1, an x-ray detector 2 is mounted on a stand 1. A dose measurement device 4 (for example an ionization chamber), a scattered-ray grid 5 and a subject 6 to be irradiated (for example a patient) are located in the beam path between an x-ray source 3 and the x-ray detector 2. The x-ray detector 2 is connected via a data line 7 with a computer 8, and the dose measurement device 4 is connected via a control line 9 with a high-voltage generator 10 that includes a control unit 10A. As soon as a predetermined dose rate has been measured by means of the dose measurement device 4, the high-voltage generator 10 is deactivated by the control unit 10A. Exposing the patient 6 to a dose of x-rays that is too high is prevented.

FIG. 2 shows a perspective view of a known x-ray detector 2. A photodiode array 12 formed from a number of photodiodes 11 is overlaid by a luminophore layer 13 produced, for example, from CsI. Each of the photodiodes 11 has a switch 11a. Given suitable actuation of the switch 11a, it is possible to sequentially read out the photodiodes 11, for example, line-by-line. Incident x-ray radiation is designated with the reference character R, and the radiation-incident surface of the luminophore layer 13 is designated with the reference character E.

FIG. 3 shows a schematic cross-section view of a first embodiment of an inventive x-ray detector 2A. The luminophore layer 13 is located on the photodiode array 12 produced, for example, from amorphous silicon. A further photodiode array 15 formed from a number of further photodiodes 14 is located on the incident surface E of the luminophore layer 13. The photodiode array 12 is connected by means of a connection line 16 with an electronic evaluation circuit 17. The light-sensitive surface of each further photodiode 14 faces the photodiode array 12.

Figure 4:
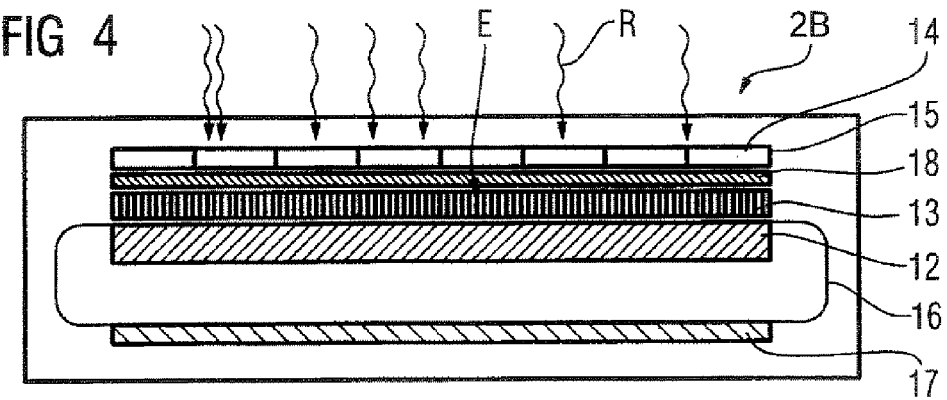
FIG. 4 is a schematic cross-section view of a second embodiment of an x-ray detector in accordance with the invention.

In a second embodiment of the inventive x-ray detector 2B shown in FIG. 4, a layer 18 that is semi-transparent for light is disposed on the incident surface E of the luminophore layer 13. The further photodiode array 15 is located on the semi-transparent layer 18.

Figure 5:
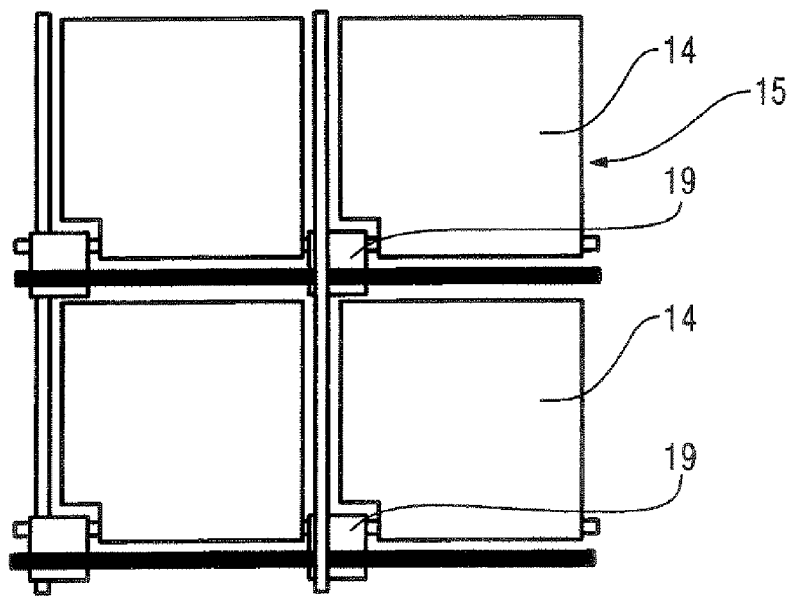
FIG. 5 is a plan view of further photodiodes for either of the x-ray detectors shown in FIGS. 3 and 4.

FIG. 5 shows a plan view of a section of the further photodiode array 15. A switch 19 is associated with each of the further photodiodes 14. It is thereby possible to read out line-by-line the charges measured with the further photodiodes 14. The charges read out can be integrated with a suitable integration device. The radiation dose rate can be determined from the integrated measurement values with spatial resolution.

Figure 6:
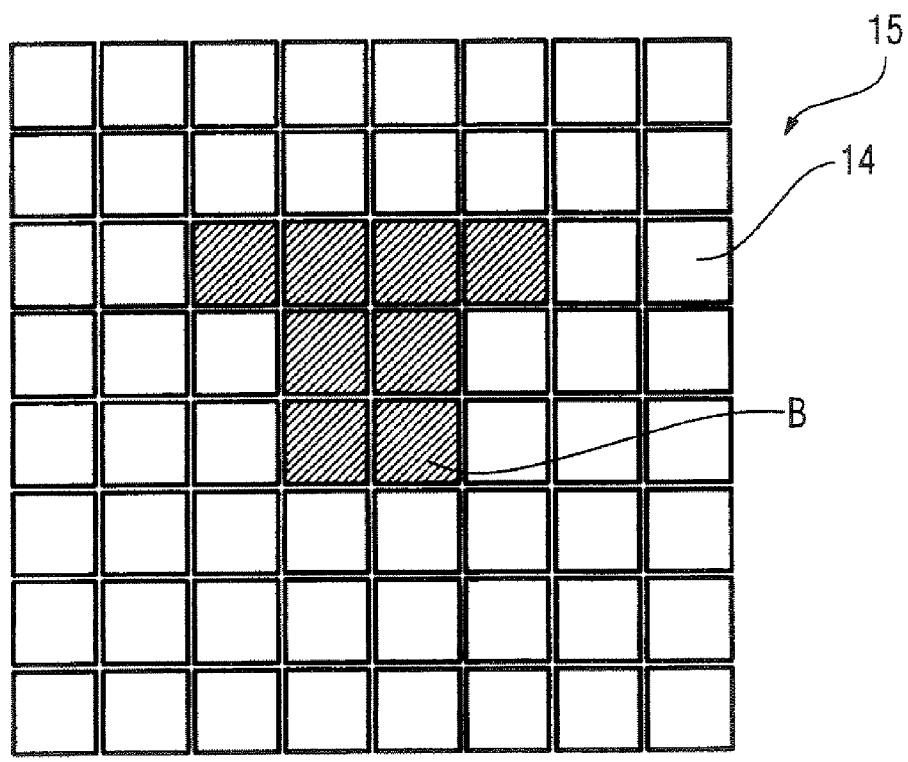
FIG. 6 is a plan view of either of the x-ray detectors shown in FIGS. 3 and 4.

FIG. 6 shows a plan view of the further photodiode array 15. To determine a radiation dose rate, it is, for example, possible to select a predetermined region B that is formed from a number of the further photodiodes 14 for use in determining the dose rate.

The further photodiodes 14 are appropriately produced from an x-ray-neutral semiconducting organic material. Such a material does not or does not significantly absorb x-rays. No structures are imaged on the luminophore 13 downstream in the beam path given the irradiation with x-ray radiation. Such further photodiodes produced from an organic material can be produced in extremely thin layers of 100 nm to 1.0 μm. They can be provided cheaply. There is no need for a separate dose measurement device 4 (for example an ionization chamber) arranged apart from the x-ray detector 2.

The photodiode array 12 can be formed, for example, from 3000×3000 photodiodes 11. Each of the photodiodes 11 forms a pixel. For dose measurement, such fine structuring of the further photodiodes 14 is not necessary. The provision of 20×20 further photodiodes 14 is sufficient to measure the dose rate. The further photodiodes 14 appropriately cover the entire detection surface of the photodiode array 12, The further photodiodes 14 thus exhibit a significantly larger detection area than the photodiodes in the array 12.

Although modifications and changes may be suggested by those skilled in the art, it is the intention of the inventor to embody within the patent warranted hereon all changes and modifications as reasonably and properly come within the scope of his contribution to the art.

I claim as my invention:

1. An x-ray detector comprising:
    a plurality of detector elements, each of said detector elements comprising a first photodiode consisting of inorganic semiconductor material, and a luminophore applied on said first photodiode, said luminophore having a radiation-incident surface adapted to face incoming x-ray radiation; and
    a plurality of second photodiodes disposed on said radiation-incident surface of said luminophore overlying at least some of said detector elements, and each of said second photodiodes having a light-sensitive surface facing the first photodiode of said at least some of said detector elements, each of said second photodiodes being comprised of an organic semiconductor material formed by a thin layer having a thickness in a range between 0.1 and 1.5 μm.

2. An x-ray detector as claimed in claim 1 wherein each of said second photodiodes consists of materials having an average atomic number Z<14.

3. An x-ray detector as claimed in claim 1 wherein each of said second photodiodes consists of materials having an average atomic number Z<10.

4. An x-ray detector as claimed in claim 1 wherein said luminophore comprises scintillator material selected from the group consisting of gadolinium oxide sulfide CsI, and NaI.

5. An x-ray detector as claimed in claim 1 comprising a layer that is semi-transparent for light disposed between said luminophore and said second photodiodes.

6. An x-ray detector as claimed in claim 1 wherein each of said detector elements comprises a switch connected to the first photodiode thereof, operable for reading out that detector element.

7. An x-ray detector as claimed in claim 1 wherein the respective photodiodes of said plurality of detector elements form a photodiode array.

8. An x-ray detector as claimed in claim 1 comprising a plurality of switches respectively connected to said second photodiodes, respectively operable for reading out said second photodiodes.

9. An x-ray detector as claimed in claim 1 wherein said plurality of second photodiodes form a photodiode array.

10. An x-ray detector as claimed in claim 1 wherein said luminophore comprises a layer overlying the respective first photodiodes of said detector elements.

11. An x-ray detector as claimed in claim 1 wherein each of said first photodiodes has a light sensitive surface, and wherein the light-sensitive surface of each of said second photodiodes is larger than the light-sensitive surface of each of said first photodiodes.

12. An x-ray detector as claimed in claim 1 wherein said plurality of first photodiodes is a multiple of said plurality of second photodiodes.

13. An x-ray detector as claimed in claim 12 wherein said plurality of first photodiodes is an even multiple of said plurality of second photodiodes.

14. An x-ray detector as claimed in claim 1 wherein said first photodiode consists of amorphous silicon as said inorganic semiconducting material.

* * * * *